(12) United States Patent
Abe

(10) Patent No.: US 6,388,738 B1
(45) Date of Patent: May 14, 2002

(54) RANGEFINDER OPTICAL SYSTEM

(75) Inventor: Tetsuya Abe, Hokkaido (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/516,892

(22) Filed: Mar. 2, 2000

(30) Foreign Application Priority Data

Mar. 3, 1999 (JP) .......................................... 11-055334

(51) Int. Cl.$^7$ ................................................. G01C 3/12
(52) U.S. Cl. .......................................... 356/17; 396/141
(58) Field of Search .................................. 356/9, 12, 13, 356/16, 17, 19; 396/138, 139, 140, 141, 142, 143

(56) References Cited

U.S. PATENT DOCUMENTS

| 3,053,136 A | * | 9/1962 | Ito et al. | 396/141 |
| 5,895,131 A |   | 4/1999 | Yano | 396/116 |
| 5,907,726 A |   | 5/1999 | Abe et al. | 396/141 |
| 6,035,140 A |   | 3/2000 | Hasushita | 396/141 |
| 6,041,186 A | * | 3/2000 | Sensui | 396/141 |

FOREIGN PATENT DOCUMENTS

| JP | 3022111 | 12/1995 |
| JP | 9-244103 | 9/1997 |

* cited by examiner

Primary Examiner—F. L. Evans
(74) Attorney, Agent, or Firm—Greenblum & Bernstein P.L.C.

(57) ABSTRACT

A rangefinder optical system with a first optical system, a field frame optical system, and a second optical system, further including a field frame reflection member; a second optical system reflection member, and an optical-path merging member of the second optical system. A second image by the second optical system is formed on the side of the second optical system reflection member with respect to the optical-path merging member of the second optical system, i.e., when viewed from the first optical system, the second image is formed at the position substantially optical-equivalent to the position of the field frame member.

7 Claims, 5 Drawing Sheets

RANGEFINDER OPTICAL SYSTEM

BACKGROUND OF THE INVENTION

1. Field of the Invention

The present invention relates to a rangefinder optical system in which an in-focus state can be detected by superimposing two images formed by the first and second optical systems which are apart from each other by a predetermined base length.

2. Description of the Related Art

A rangefinder optical system, which is the combination of the first optical system (first window), a field frame optical system, and the second optical system (second window), is known in the art.

For example, a conventional rangefinder optical system, as shown in FIG. 6, includes the first optical system 20 through which a first image (finder image) is viewed, a field frame optical system 30 through which a field frame image is formed, and the second optical system 40 through which a second image is formed. The first optical system 20, which is formed as an inversed Galilean type finder optical system, includes a negative objective lens element and a positive eyepiece lens element 15. Through the eyepiece lens element 15, an erected image of an object with the proper orientation thereof is viewed. Furthermore, the field frame optical system 30 includes a field frame member 32 which is an opaque member on which light-transmitting portions are formed, and a reflection member 33, lens elements and the like. More concretely, one of the light-transmitting portions which is provided on the periphery of the field frame member 32 (hereinafter, the peripheral light-transmitting portion) is provided in the form of the field frame; and the other light-transmitting portion which is provided at the center thereof (hereinafter, the central light-transmitting portion) is for transmitting a bundle of rays carrying the second image. Further, in the first optical system 20, an optical-path merging prism 24 is provided, and thereby the optical path of the first optical system 20 and that of field frame optical system 30 are merged. According to this arrangement, a bundle of rays which is incident, from the object, on the peripheral light-transmitting portion of the field frame member 32 is formed as a field frame image. Subsequently, the field frame image which is superimposed onto the above first image is viewed through the eyepiece lens element 15.

The second optical system 40 includes a positive objective lens group 44 and a reflection member 41 having a plurality of reflection surfaces. The second image is formed in the vicinity of the field frame member 32. Due to the peripheral and central light-transmitting portions of the field frame member 32, the second image and the field frame image are combined thereat, and transmitted, along the optical path of the field frame optical system 30, towards the first optical system 20. The second image and the field frame image are superimposed onto the first image, and these superimposed images are viewed through the eyepiece lens element 15. Since the field frame image is required to be viewed brightly and clearly, it is preferable that the incident optical axis of the field frame optical system 30 be made parallel with the optical axis of the first optical system 20, and that the field frame member 32 be positioned to face the object. On the other hand, in order to increase the precision of the rangefinder, it is necessary to maintain the base length L between the incident optical axis of the first optical system 20 and the incident optical axis of the second optical system 40 as long as possible.

The base length L is substantially determined by the sum of the following distances:

(i) the distance from the incident surface of the second optical system 40 to the objective lens group 44;

(ii) the focal length of the objective lens group 44; and (iii) the distance from the field frame member 32 to the first optical system 20.

The focal length of the objective lens group 44 is determined so that the finder magnification of the first optical system 20 is the same as that of the second optical system 40 in order to make the size of the images (i.e., the first image and the second image) equal. The finder magnification is defined as the angular magnification. On the other hand, if an attempt is made to avoid increasing the size of the reflection member 41, there is a need to make the distance from the incident surface of the second optical system 40 to the objective lens group 44 as short as possible. Therefore in order to maintain the longer base length L, it is necessary to increase the length P (in the direction of the base length L) between the first optical system 20 and the field frame member 32.

However, in the above conventional arrangement in which the second image is formed in the vicinity of the field frame member 32, the base length L cannot be made longer due to the following requirements to be satisfied at the same time:

(i) in order to view the field frame image clearly, the field frame member 32 has to be positioned to face towards the object so that much light from the object is incident thereon; and (ii) for the purpose of obtaining substantially the same diopters, through the eyepiece lens element 15, for the object image formed through the first optical system 20, for the field frame member 32, and for the second image formed in the vicinity of the field frame member 32, the field frame member 32 and the first optical system 20 have to be positioned closer, since there is a need to make the position of a virtual image formed by the objective lens element of the first optical system 20, and the position of the field frame member 32 optically equivalent with respect to the eyepiece lens element 15.

In another conventional rangefinder optical system, as shown in FIG. 7, in order to make the distance between the field frame member 32 and the first optical system 20 longer, the optical axis from the optical-path merging prism 24 to the second optical system 40 is inclined. However, the field frame member 32 cannot be positioned to face towards the object, and therefore the field frame image becomes unclear.

Furthermore, in the case where the above-described finder optical system is provided in a camera, it is preferable that the dimensions of both the field frame optical system 30 and the second optical system 40 measured in a direction parallel with the optical axis of the first optical system 20 (hereinafter, the thickness of a camera) be as small as possible in order to achieve miniaturization of the camera, and to make space for providing other components. However, as explained, in front (the object side) of the field frame member 32 of the field frame optical system 30, the second optical system 40 is positioned; and in the second optical system 40, there is a need to provide an optical system to make the incident optical axis to be incident on the field frame member 32 substantially parallel with the incident optical axis of the first optical system 20. As a result, it is difficult to reduce the thickness of the field frame optical system 30 and the second optical system 40

SUMMARY OF THE INVENTION

It is an object of the present invention to provide a rangefinder optical system through which a bright and clear field frame image can be viewed, and in which the base length can be made longer.

Further, it is another object of the present invention to provide a rangefinder optical system which can reduce the thickness of the field frame optical system and that of the second optical system.

The present invention is based on a conception that the base length between the first optical system and the second optical system is made longer by merging the optical path of the field frame optical system and that of the second optical system on the side of first optical system with respect to the filed frame member, and thereby the thickness of the field frame optical system and that of the second optical system are reduced.

In order to achieve the above-mentioned objects, there is provided a rangefinder optical system including a first optical system through which a first image is viewed; a field frame optical system, having a field frame member, for forming a field frame image; and a second optical system which forms a second image, and has an incident optical axis being apart from an incident optical axis of the first optical system by a predetermined base length.

By merging the optical paths of the first optical system, the field frame optical system and the second optical system, the first image, the field frame image and the second image are viewed in a single field of view.

In the above rangefinder optical system, there are further provided a field frame reflection member for deflecting a bundle of rays transmitted through the field frame member towards an optical-path merging member in the first optical system; a second optical system reflection member (hereinafter, a second reflection member) for deflecting the incident optical axis of the second optical system towards the field frame reflection member, and an optical-path merging member of the second optical system (hereinafter, a second optical-path merging member), integrally formed on the field frame reflection member, for deflecting a bundle of rays from the second reflection member towards the first optical system, and merging the bundle of rays into the field frame optical system.

According to the above arrangement, the second image by the second optical system is formed on the side of the second reflection member with respect to the second optical-path merging member. In other words, the second image is formed at a position substantially optical-equivalent to the position of the field frame member with respect to the eyepiece lens element 15.

The rangefinder optical system according to the present invention preferably satisfies the following conditions:

$$|\theta F|<20° \quad (1)$$

$$100°<\theta M<160° \quad (2)$$

wherein

θF designates an angle between the optical axis of the field frame optical system in the vicinity of the field frame member, and the incident optical axis of the first optical system; and θM designates an angle between the optical axis extending from the second reflection member to the second optical-path merging member, and the optical axis reflected therefrom.

The second reflection member may include, for example, a first reflection sub member of the second optical system (hereinafter, a first reflection sub member) for deflecting the incident optical axis of the second optical system towards the first optical system, and a second reflection sub member of the second optical system (hereinafter, a second reflection sub member) for further deflecting the optical axis deflected by the first reflection sub member towards the second optical-path merging member. In this arrangement, the second reflection sub member preferably satisfies the following condition:

$$100°<\theta D<160° \quad (3)$$

wherein

θD designates an angle between the optical axes incident on and reflected by the second reflection sub member of the second optical system.

Further, either the first or the second reflection sub member can be constituted by a roof reflection surface having two orthogonal reflection surfaces.

The rangefinder optical system according to the present invention, the field frame member can be positioned perpendicular to the optical axis of the first optical system, and thereby a bright and clear field frame image can be obtained.

The present disclosure relates to subject matter contained in Japanese Patent Application No. Hei-11-55334 (filed on Mar. 3, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
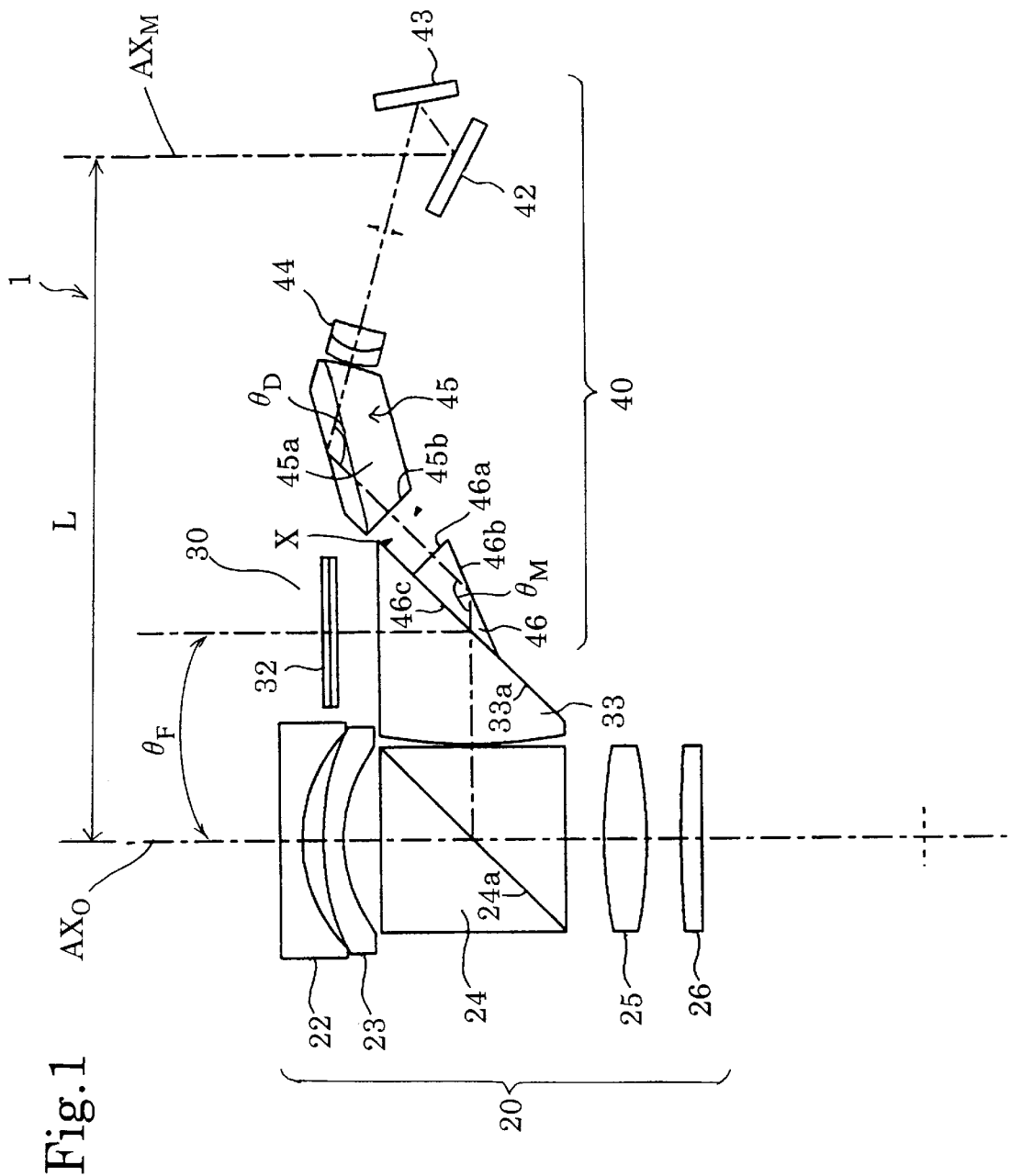
FIG. 1 is a plan view of a rangefinder optical system according to the present invention.
Figure 3:
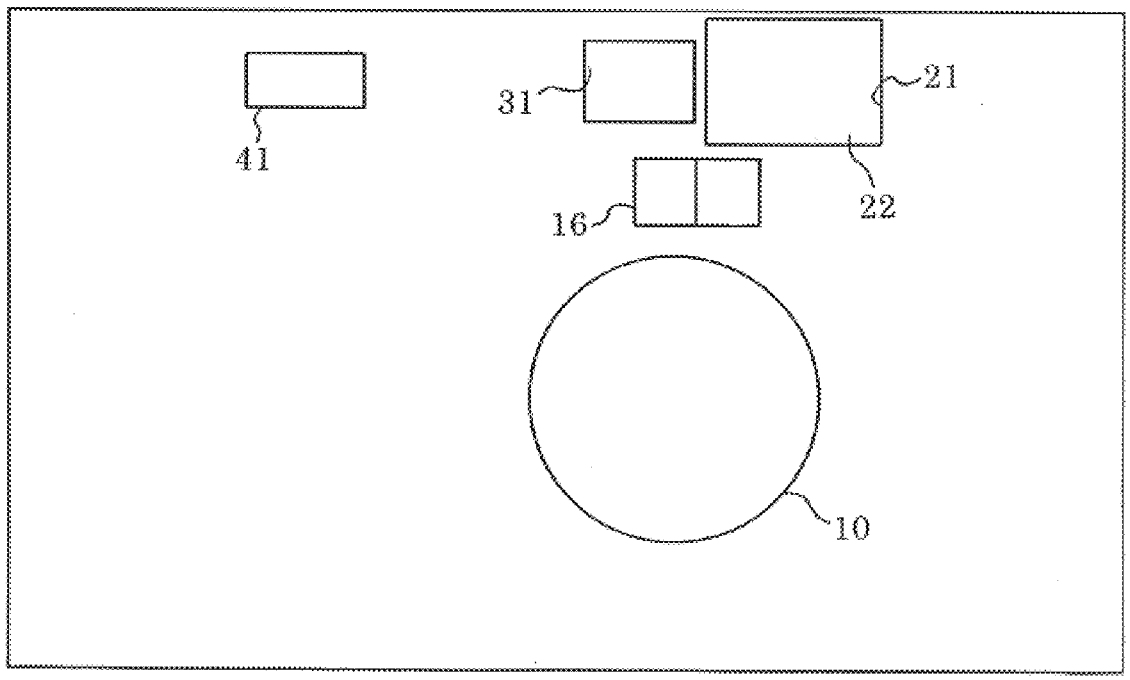
FIG. 3 is a front elevation of a camera in which the rangefinder optical system according to the present invention is provided.
Figure 4:
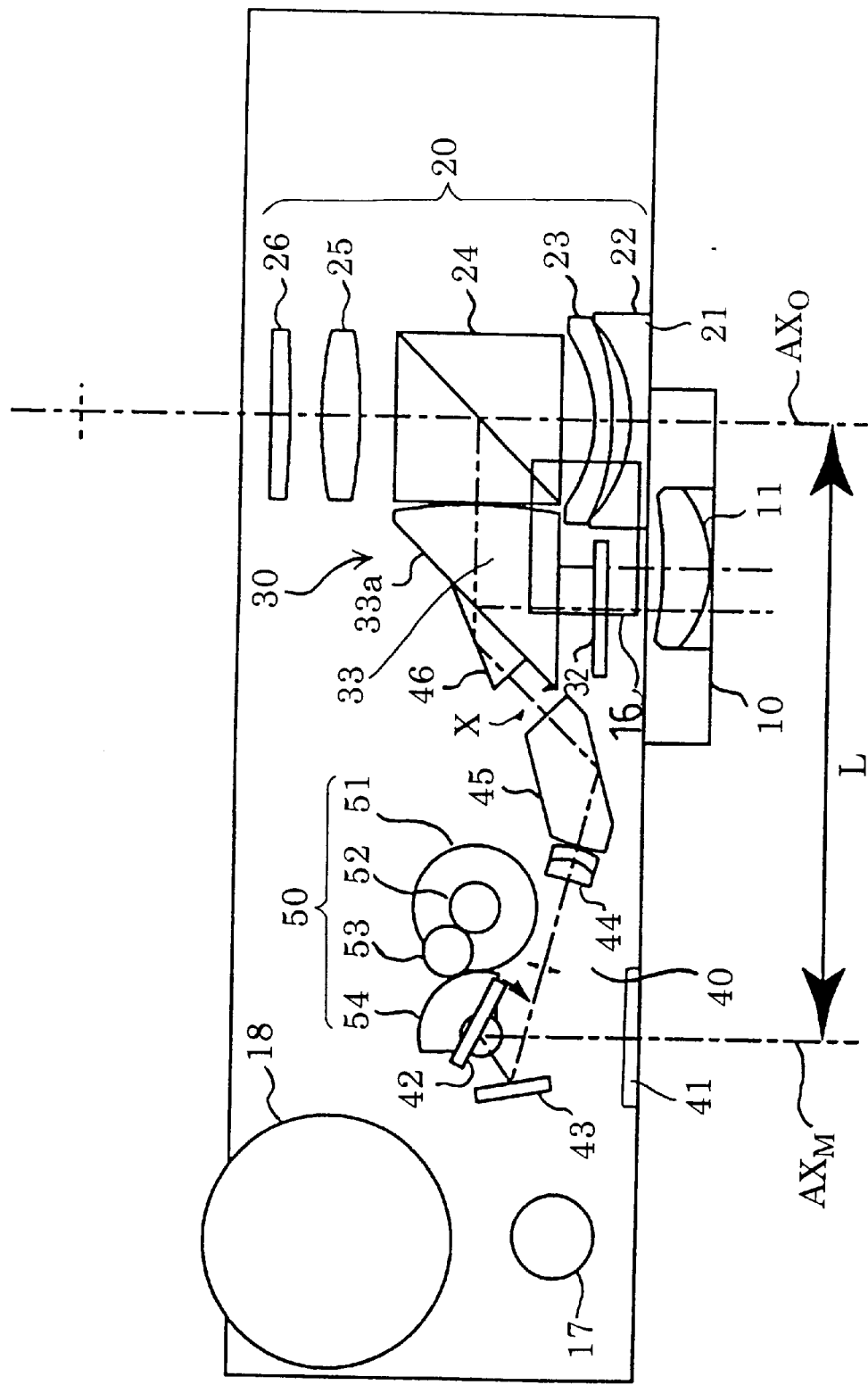
FIG. 4 is a transverse cross sectional view of the rangefinder optical system shown in FIG. 3.
Figure 5:
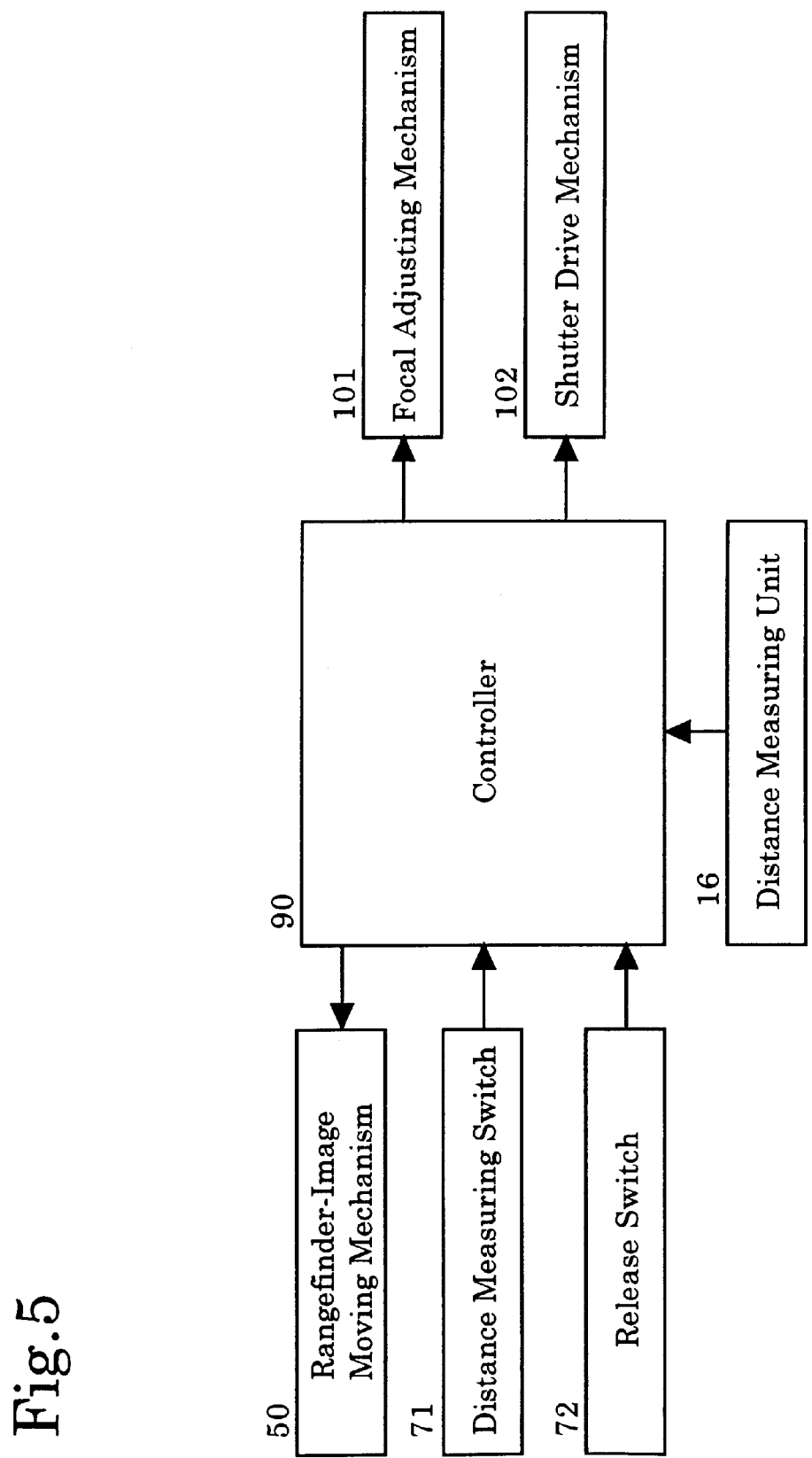
FIG. 5 is a block diagram of a control system of the camera shown in FIG. 3.
Figure 6:
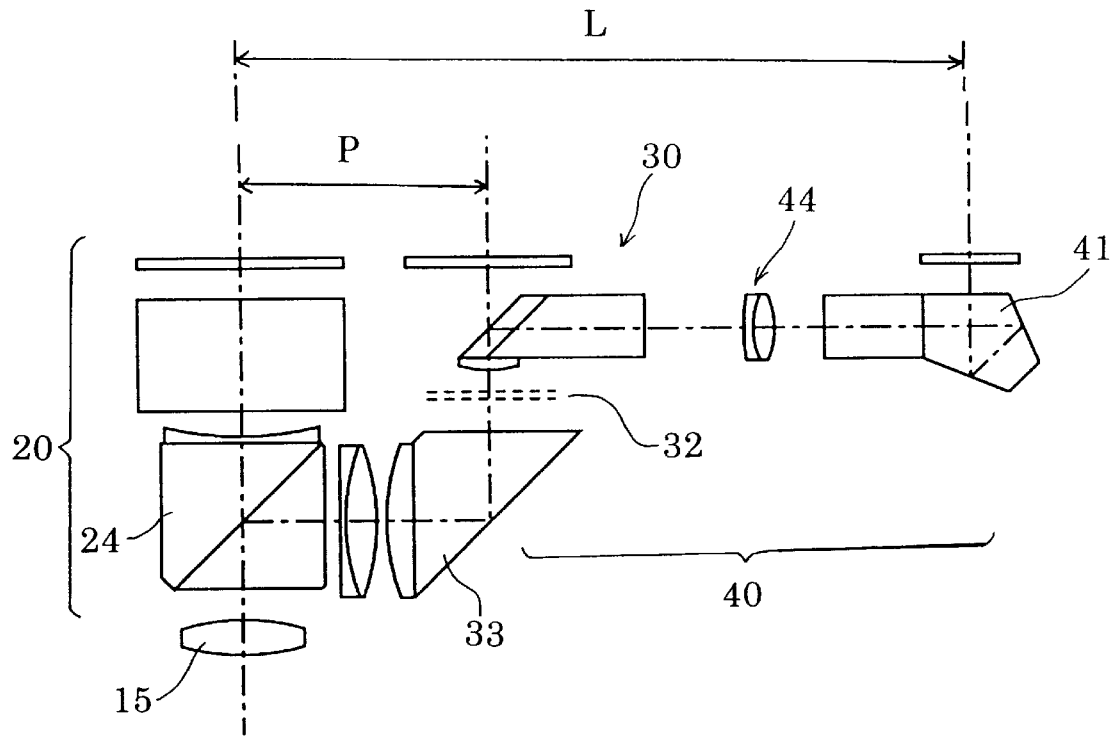
FIG. 6 is a view showing a rangefinder optical system of the prior art.
Figure 7:
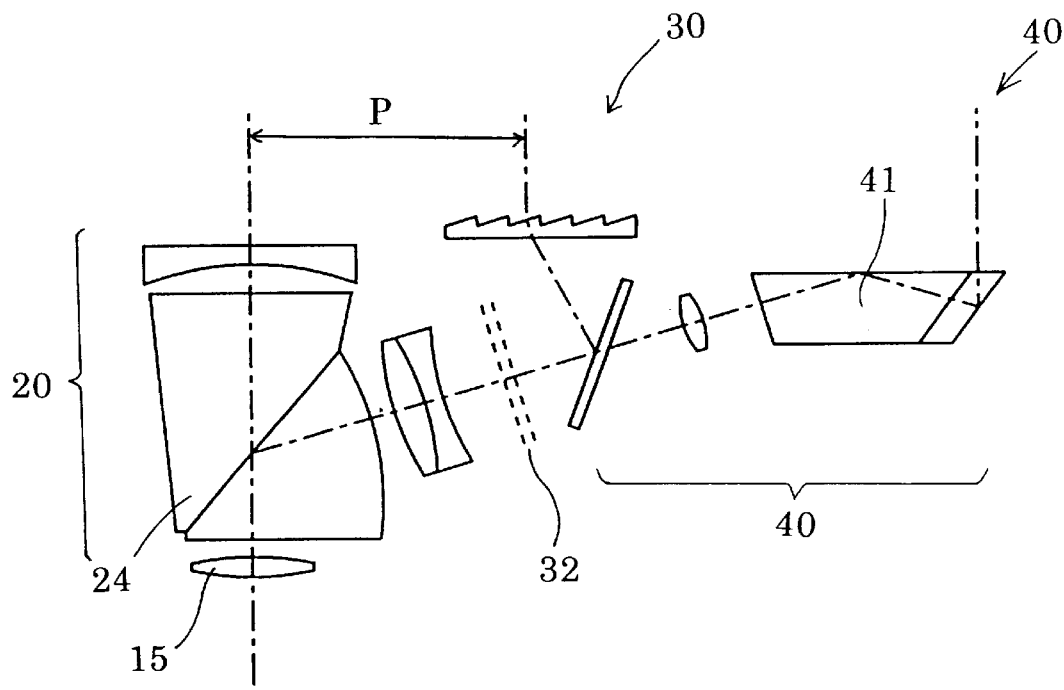
FIG. 7 is a view showing another rangefinder optical system of the prior art.

FIGS. 3 through 5 show a camera in which a finder optical system to be discussed hereinafter is provided. FIG. 1 exclusively shows the arrangement of the finder optical system whose front-to-rear orientation is reversed in comparison with FIG. 4. The camera includes a rangefinder optical system 1, and a photographing optical system 10 with a focal adjustment mechanism. A feature resides in an functional arrangement in which the photographing optical system 10 and the rangefinder optical system 1 are optically and mechanically independent of each other, i.e., each of these systems is independently operated in accordance with information on an object distance obtained from an object distance measuring unit (object distance measuring system) 16. In FIG. 4, a numeral 17 indicates a shutter release button, and a numeral 18 indicates a camera-to-object distance (photographing distance) input dial.

The rangefinder optical system includes, from the right side of the camera shown in FIG. 4, a first optical system 20, a field frame optical system 30, and a second optical system 40. The first optical system 20 includes a planoconcave first objective lens element 22 fitted into a first window 21, a negative meniscus second objective lens element 23, an optical-path merging prism (optical-path merging member) 24, a biconvex first eyepiece lens element 25, and a planoconvex second eyepiece lens element 26, in this order from the object. The above described first optical system is an inversed Galilean type finder optical system, and accordingly a virtual image formed by the negative objective lens elements 22 and 23 is viewed through the first eyepiece lens 25 and the second eyepiece lens 26 as the erected image of the object with the proper orientation thereof. The optical-path merging prism 24 may be replaced with a half mirror and the like.

The field frame optical system 30 includes a light-collection window 31, a field frame member 32, and a prism 33, in this order from the object. The field frame member 32 which is to form the shape of a field frame in the finder field of view is constituted by an opaque member on which light-transmitting portions are formed, or by an LCD. A bundle of rays being incident on the light-collection window 31 progresses through the light-transmitting portions of the field frame member 32, and is reflected by a reflection surface (total reflection surface) 33a of the prism 33 towards the first optical system 20. Further, the bundle of rays is deflected by the optical-path merging prism 24, and thereby the bundle of rays is merged into the optical path of the first optical system 20. Subsequently, through the first eyepiece lens element 25 and the second eyepiece lens element 26, a first image, a field frame image are viewed in a single field of view. The light-transmitting portion for the field frame is formed on the periphery of the field frame member 32.

The second optical system 40 includes a second window 41, a first mirror 42, a second mirror 43, an objective lens group 44, a roof prism 45, and a prism 46 which is cemented to the reflection surface 33a of the prism 33 of the field frame optical system 30, in this order, along the optical paths, from the object. An inverted second image formed by the objective lens group 44 is reinverted in the right-and-left direction by the first and second mirrors 42, 43, and reinverted in the up-and-down direction by the roof prism 45, and thereby an erected second image is formed in the vicinity of the emitting surface of the roof prism 45. Subsequently, the bundle of rays carrying the erected second image is reflected by the reflection surface 46b of the prism 46, and is incident on the optical-path merging prism 24 via the prism 33 of the field frame optical system 30. Accordingly, the first image, the field frame image and the second image are superimposed and viewed in the single field of view through the first eyepiece lens element 25 and the second eyepiece lens element 26. The reflection surface 33a of the prism 33 is a total reflection surface with respect to the field frame optical system 30; however, the reflection surface 33a is a transmission surface with respect to the second optical system 40. The prism 46 is cemented to a central portion of the reflection surface 33a of the prism 33 so that the optical path of the second optical system 40 can be formed in an area, around the optical axis of the field frame optical system 30, which is not used by the field frame optical system 30.

The incident optical axis AXм of the second optical system 40 is apart, by the base length L, from the incident optical axis AXo of the first optical system 20. The second optical system 40 is further provided with a second-image moving mechanism 50 (refer to FIG. 4). The second-image moving mechanism 50 includes a motor 51, a spur gear 52, a spur gear 53 and a sector gear 54. The first mirror 42 of the second optical system 40 is fixed to the sector gear 54. The rotation of the motor 51 is transmitted to the spur gear 52, the spur gear 53 and the sector gear 54. Upon rotation of the sector gear 54, the first mirror 42 is rotated so that the incident optical axis AXм rotates about a point, on the first mirror 42, at which the axis AXм is incident.

Figure 2:
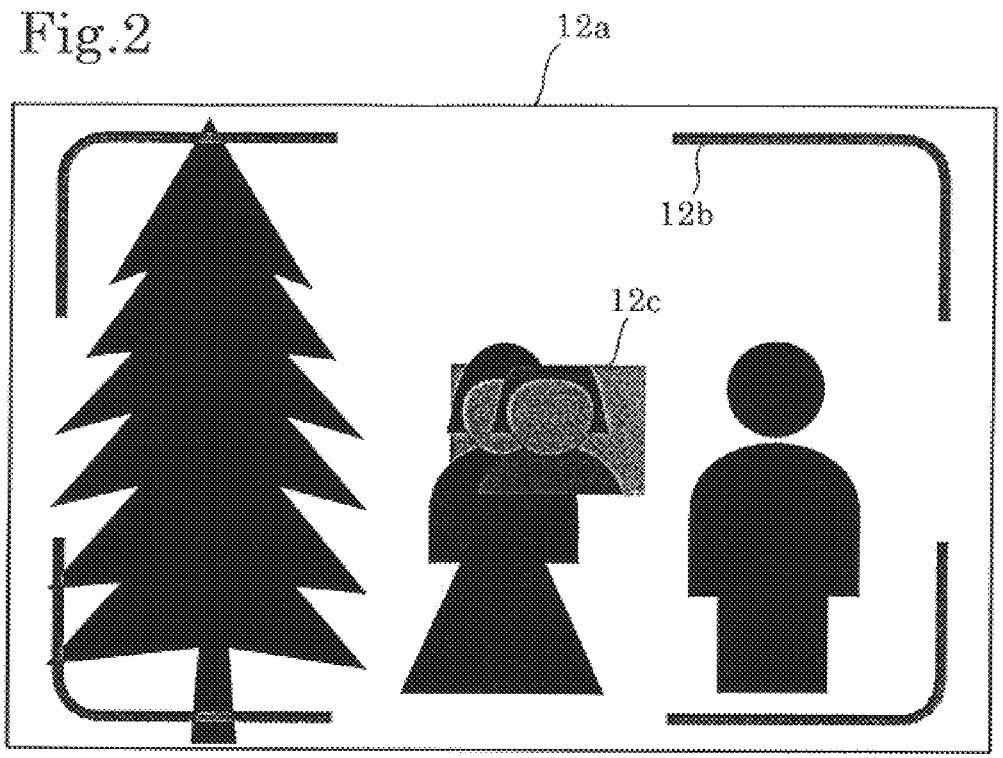
FIG. 2 is a view of typical finder images of the rangefinder optical system according to the present invention.

FIG. 2 is typical superimposed images viewed through the eyepiece lens element 25 and the eyepiece lens element 26. As explained, the first image 12a, the field frame image 12b and the second image 12c are superimposed and viewed in the single field of view. The first image 12a and the second image 12c can be viewed as superimposed images. According to the rotation of the first mirror 42, the second image 12c moves, with respect to the first image 12a, along the direction of the base length L. Consequently, the second image 12c is exactly superimposed onto the first image 12a, or is apart therefrom. For a specific object viewed in the finder field of view, in order to move the second image 12c with respect to the first image 12a, the rotational angle of the first mirror 42, i.e., the rotational angle of the motor 51, is determined by object distance information on the specific object detected through the object distance measuring unit 16.

FIG. 5 is a block diagram of a control system of the camera. A distance measuring switch 71 and a release switch 72 are the switches associated with the shutter release button 17. In other words, when the shutter release button 17 is depressed by a half step, the distance measuring switch 71 is turned ON; and further, when the shutter release button 17 is fully depressed, the release switch 72 is turned ON. Upon the distance measuring switch 71 being turned ON, a controller 90 operates the distance measuring unit 16 in order to obtain information related to the object distance (object distance information). Subsequently, in accordance with the object distance information, the focal adjusting mechanism (auto-focus mechanism) 101 of the photographic optical system 10 is operated to perform focusing on the object. At the same time, the motor 51 of the rangefinder-image moving mechanism (the second-image moving mechanism) 50 is operated so that the first mirror 42 is rotated by a predetermined angle according to the object distance information.- As a result, the second image 12c coincides with the first image 12a, and thereby the photographer can confirm that an in-focus state is obtained. Furthermore, when the release switch 72 is turned ON, the controller 90 operates a shutter drive mechanism 102 to perform an exposure operation to thereby complete a photographing operation.

As explained, the feature resides in the arrangement in which the focal adjusting mechanism 101 and the rangefinder-image moving mechanism (the second-image moving mechanism) 50 are operated according to the object distance information detected by the distance measuring unit 16. According to the above arrangement, the photographer can confirm, by the first and second images 12a, 12c seen in the finder view field, whether or not the photographing lens 10 is in an in-focus state with respect to the object to be photographed. Through this process, the photographer can assume that the object is in an in-focus state during an actual photographing operation. Instead of using object distance information detected by the distance measuring unit 16, the photographic distance input dial 18 can be used to input the object distance information, while the photographer is observing a degree of superimposing on the first and second images through the finder field of view.

The rangefinder optical system will further be explained. In the above-described field frame optical system 30, the field frame member 32 is substantially perpendicular to the optical axis AXo of the first optical system 20. The prism 33 which is provided behind the field frame member 32 constitutes the field frame reflection member which deflects a bundle of rays transmitted through the field frame member 32 towards the first optical system 20.

Furthermore, in the second optical system 40, the first and second mirrors 42 and 43 constitute the first reflection sub member for deflecting the incident optical axis AXM of the second optical system 40 towards the first optical system 20. The roof prism 45 constitutes the second reflection sub member for further deflecting the optical axis deflected by the first reflection sub member 42, 43 towards the prism 46 which is cemented to the reflection surface 33a of the prism 33. The prism 46 constitutes the optical-path merging member of the second optical system 40 for deflecting a bundle of rays from the roof prism 45 towards the first optical system 20, and merging the bundle of rays into the field frame optical system 30.

The first and second mirrors 42, 43 deflect the optical axis of the second optical system 40 by an angle less than 90° with respect to the incident optical axis AXM, i.e., the optical axis thereof obliquely extends towards the object, and thereby the optical axis is made incident on the roof prism 45. Further, the roof prism 45 then deflects the optical axis towards the rear side of the camera, and thereby the optical axis is made incident on the prism 46. According to the deflected optical paths as described above, the thickness of the field frame optical system 30 and that of the second optical system 40 can be reduced.

Also, in the second optical system 40, an inverted second image formed by the objective lens group 44 is reinverted in the right-and-left direction by the first and second mirrors 42, 43, and reinverted in the up-and-down direction by the orthogonal reflection surfaces 45a of the roof prism 45, and thereby an erected second image is formed in the vicinity of the position X located between the emitting surface 45b of the roof prism 45 and the incident surface 46a of the prism 46. The image-forming position X of the objective lens group 44, viewed from the eyepiece lens elements 25 and 26 of the first optical system 20, is optically equivalent to the position of the field frame member 32. The optical path of the second optical system 40 is merged into the optical path of the field frame optical system 30, and subsequently, these merged optical paths are further merged into the optical path of the first optical system 20 through a semi-transmission surface 24a of the optical-path merging prism 24. Accordingly, the first image, the field frame image and the second image are superimposed and viewed in the single field of view through the first eyepiece lens element 25 and the second eyepiece lens element 26.

The field frame image is generally formed on the periphery of the finder field of view. Therefore only the periphery of the reflection surface 33a of the prism 33 is used as the optical path for the field frame optical system 30. On the other hand, the second image is generally formed at the center of the finder field of view. Therefore the optical path for the second optical system 40 can be arranged to transmit through only the central portion of the reflection surface 33a.

In the optical arrangement of this embodiment, the emitting surface 46c of the prism 46 of the second optical system 40 is cemented to the central portion of the reflection surface 33a of the lens prism 33, and thereby the optical path of the field frame optical system 30 and the optical path of the second optical system 40 are merged. The optical path of the field frame optical system 30 can be deflected at the reflection surface 33a by total reflection. A bright and clear field frame image can therefore be obtained without any reflective coating on the reflection surface 33a. Furthermore, if the prism 33 and the prism 46 are formed with an integral resin molding, the cost thereof can be reduced.

Condition (1) specifies the angle formed by the incident optical axis of the first optical system 20 and that of the field frame optical system 30. By satisfying this condition, the incident optical axis of the field frame optical system 30 which passes through the field frame member 32 becomes substantially parallel with the incident optical axis of the first optical system 20. In other words, the field frame member 32 can be positioned substantially perpendicular to the incident optical axis of the first optical system 20. Accordingly, a bundle of rays being incident from the object can be taken as a light source for the field frame image, and thereby the brightness ratio of the field frame image to the first image can be maintained constant, and a bright and clear field frame image can be obtained.

If $|\theta F|$ exceeds the upper limit of condition (1), a bright and clear field frame image cannot be obtained.

It is necessary for the base length L between the incident optical axis AXM of the second optical system 40 and the incident optical axis AXo of the first optical system 20 to be maintained as long as possible in order to increase distance measuring precision.

On the other hand, when installation of the components of the rangefinder optical system into a camera is considered, it is necessary to position the optical path of the second optical system 40 as close to the front of the camera body as possible, in order to efficiently use the space therein.

By positioning the optical path of the second optical system 40, which is split from the field frame optical system 30, in a forward and oblique direction within the extent that condition (2) is satisfied, the base length L can be made relatively long with respect to the optical path length of the second optical system 40, and further the optical path of the second optical system 40 can be positioned close to the front of the camera body.

If $\theta M$ exceeds the lower limit of condition (2), the optical path of the second optical system 40 and the optical path of the field frame optical system 30 interfere with each other.

If $\theta M$ exceeds the upper limit of condition (2), the optical path of the second optical system 40 has to be moved too much towards the inside of the camera body, which causes difficulties in installing various components thereof.

In order to increase the base length L between the first optical system 20 and the second optical system 40, it is preferable that the angle between the optical axes incident on and emitted from the roof prism 45 (the second reflection sub member) be as close to 180° as possible. On the other hand, it is preferable that the above angle be as small as possible, if an attempt is made to position the roof prism 45, with a relatively short optical path length and within a smaller space, between the objective lens group 44 and the image-forming position X thereof.

By setting the angle between the optical axes incident on and emitted from the roof prism 45 as defined in condition (3), the base length L between the first optical system 20 and the second optical system 40 can be made longer while the second optical system 40 can be provided in a well-balanced manner with respect to the first and field frame optical systems; and further the optical path length of the roof prism 45 can be made shorter.

If $\theta D$ exceeds the lower limit of condition (3), the base length L between the first optical system 20 and the second optical system 40 becomes too short.

If θD exceeds the upper limit of condition (3), the optical path length of the roof prism 45 cannot be made shorter.

Since the second optical system 40 forms an inverted image through the positive objective lens group 44, an erecting optical system is required. It is known that an erecting optical system which is constituted by a combination of reflection surfaces needs at least two reflection surfaces respectively for the right-and-left direction and the up-and-down direction. Therefore a longer optical path length has to be considered. On the other hand, according to the embodiment, the roof prism 45 in which two orthogonal reflection surfaces are provided in a plane including the incident and emitting surfaces thereof constitutes the erecting optical system which has a shorter optical path length and can be provided in a smaller space.

The first reflection sub member is constituted by two mirrors (the first and second mirrors 42, 43); however, a roof prism or a roof mirror having two orthogonal reflection surfaces can be employed. Furthermore, the second reflection sub member is constituted by the roof prism 45; however, a roof mirror having reflection surfaces formed by mirrors can be employed.

According to the above description, a rangefinder optical system, through which a bright and clear field frame image can be viewed, and in which the base length can be made longer, can be obtained.

What is claimed is:

1. A rangefinder optical system comprising a first optical system through which a first image is viewed; a field frame optical system, having a field frame member, for forming a field frame image; and a second optical system which forms a second image, and has an incident optical axis being apart from an incident optical axis of said first optical system by a predetermined base length; wherein by merging the optical paths of said first optical system, said field frame optical system and said second optical system, said first image, said field frame image and said second image are viewed in a single field of view; said rangefinder optical system comprising:

a field frame reflection member for deflecting a bundle of rays transmitted through said field frame member towards an optical-path merging member in said first optical system;

a second optical system reflection member for deflecting the incident optical axis of said second optical system towards said field frame reflection member; and an optical-path merging member of said second optical system, integrally formed on said field frame reflection member, for deflecting a bundle of rays from said second optical system reflection member towards said first optical system, and merging said bundle of rays into said field frame optical system;

wherein said second image by said second optical system is formed on the side of said second optical system reflection member with respect to said optical-path merging member of said second optical system, so that said second image is formed at a position substantially optical-equivalent to the position of said field frame member, when viewed from said first optical system.

2. The rangefinder optical system according to claim 1, wherein the following conditions are satisfied:

$|θF|<20°$ $100°<θM<160°$ wherein

θF designates an angle between the incident optical axis of said first optical system, and the optical axis of said field frame optical system in the vicinity of said field frame member; and θM designates an angle between the optical axis extending from said second optical system reflection member and being incident on said optical-path merging member of said second optical system, and the optical axis reflected therefrom.

3. The rangefinder optical system according to claim 1, wherein said second optical system reflection member comprises a first reflection sub member for deflecting the incident optical axis of said second optical system towards said first optical system, and a second reflection sub member for further deflecting the optical axis deflected by said first reflection sub member towards said optical-path merging member of said second optical system.

4. The rangefinder optical system according to claim 3, wherein the following condition is satisfied:

$100°<θD<160°$ wherein

θD designates an angle between the optical axes incident on and reflected by said second reflection sub member of said second optical system.

5. The rangefinder optical system according to claim 3, wherein said second reflection sub member comprises a roof reflection surface having two orthogonal reflection surfaces.

6. The rangefinder optical system according to claim 3, wherein said first reflection sub member comprises a roof reflection surface having two orthogonal reflection surfaces.

7. The rangefinder optical system according to claim 1, wherein said field frame member is positioned perpendicular to the optical axis of said first optical system.

\* \* \* \* \*